United States Patent [19]
Walsh et al.

[11] Patent Number: 5,319,514
[45] Date of Patent: Jun. 7, 1994

[54] DIGITAL VOLTAGE AND PHASE MONITOR FOR AC POWER LINE

[75] Inventors: Charles P. Walsh; B. Douglas Alexander, both of Great Falls, both of Mont.

[73] Assignee: Voltage Control, Inc., a Montana corporation, Great Falls, Mont.

[21] Appl. No.: 846,294

[22] Filed: Mar. 3, 1992

[51] Int. Cl.⁵ .............................................. H02H 3/24
[52] U.S. Cl. .................................... 361/59; 361/75; 361/85; 361/86; 361/90; 340/662; 363/53
[58] Field of Search .................... 361/59, 75, 86, 90, 361/85, 76, 91, 92; 340/662; 363/52, 53

[56] References Cited

U.S. PATENT DOCUMENTS

| | | | |
|---|---|---|---|
| 4,306,265 | 12/1981 | Kuntner et al. | 361/31 |
| 4,331,995 | 5/1982 | Voss | 361/85 |
| 4,346,307 | 8/1982 | Zulaski | 307/136 |
| 4,562,507 | 12/1985 | Kudo et al. | 361/85 |
| 4,567,552 | 1/1986 | Hirose | 363/87 |
| 4,616,324 | 10/1986 | Simmel | 364/483 |
| 4,999,730 | 3/1991 | Pickard | 361/59 |
| 5,126,678 | 6/1992 | Williams | 324/545 |

Primary Examiner—Emanuel T. Voeltz
Assistant Examiner—Ben Davidson
Attorney, Agent, or Firm—Marger, Johnson, McCollom & Stolowitz

[57] ABSTRACT

A digital voltage protection circuit (138) and a phase monitor circuit (154, 160, 162, 168) disconnect AC-powered user equipment (22,182) from the AC power supply (141) whenever the AC power line voltage is outside a predetermined operating voltage window and when any two phases of the power supply (141) are separated by more than a predetermined phase angle. The user equipment (182) is automatically reconnected to the power supply (141) only after the power line voltage and phase remain continuously within operating range for a predetermined delay period. The voltage monitor (138) contains a digital comparator (18) that uses integrated circuit digital logic thresholds as reference voltages for setting upper and lower voltage window limits. The controller protects the user equipment from both over-voltage and under-voltage (brownout) conditions and from phase errors.

20 Claims, 6 Drawing Sheets

DIGITAL VOLTAGE AND PHASE MONITOR FOR AC POWER LINE

BACKGROUND OF THE INVENTION

This invention relates to the field of protecting electrical circuits against potentially damaging effects of electrical transients and, more particularly, to methods and apparatus for reliably protecting AC-powered user equipment from both over-voltage and under-voltage conditions.

Many types of electrical equipment are susceptible to malfunctions or damage due to transient impulses or line voltage conditions which exceed an acceptable voltage range or window. For example, computers and TV satellite receiver decoders are very sensitive to voltage transients. AC powered motors are subject to damage from overheating when driven by AC voltages greater than or less than an intended AC voltage operating range.

Since voltage transients may be caused by such things as lightning strikes, inductive load switching and physical shock to power lines, utility companies which supply electrical power have no practical ways of preventing such occurrences. The problems are particularly acute in rural areas.

Various circuits are known that disconnect electrical power from a load when the power output is outside acceptable tolerances. For example, a crowbar circuit shunts an AC power line to ground when an over-voltage condition occurs. The shunted AC power line causes either a fuse to blow or a circuit breaker to trip thereby disconnecting the AC line from the load. After the load is isolated from the AC line, a user must locate, identify and replace or reset the fuse or circuit breaker, respectively, in order to restore AC power to the user equipment. These actions are inconvenient and extend the equipment downtime.

Some over-voltage protection circuits automatically reset when the power supply voltage falls back within an acceptable operating tolerance. These circuits however, subject user equipment to erratic on-again, off-again operation when the AC power line voltage is irregular or marginal. This intermittent operation itself can lead to potentially damaging transients, particularly if the user equipment load is inductive. For example, intermittent operation of electric motor starter windings causes them to burn out.

Actuating a relay to disconnect the AC line from electrical equipment also creates transients within the over-voltage monitoring circuit. For example, an over-voltage monitoring circuit typically requires a small amount power to operate during normal operation. When the AC line voltage is above the maximum allowable voltage level, the monitoring circuit must actuate a high current relay to disconnect power to the electrical equipment. Actuation of the relay produces electrical noise by abruptly drawing a large current in relation to the quiescent current necessary to maintain normal operation of the monitoring circuit.

Typical over-voltage protection circuits use analog components to monitor the AC line voltage. Analog circuitry however, is more susceptible to electrical noise than digital circuitry and is harder to customize for different applications. In addition, digital components are less expensive, require less support circuitry, and are more reliable over a wider range of operating conditions.

Another drawback of known over-voltage protection circuitry is that a powerful power line transient may destroy a solid state over-voltage shunt device, effectively removing it from the circuit. The user equipment is thereby left completely unprotected against any subsequent transients.

Power disconnect circuits typically offer no protection against under-voltage conditions, i.e., where the AC line voltage falls below a predetermined minimum voltage, for example, 90 volts. This is frequently referred to as a "brown-out" condition. Motors connected to refrigerant compressors and similar loads can burn out under brown-out conditions. Computer disk drive damage can also be caused by brownouts. Most AC-powered user equipment in the U.S. is designed to operate within a line voltage range (i.e. 108-132 volts). Shunt circuits therefore do not adequately protect such user equipment from both under and over-voltage conditions.

Over-voltage protection circuits are designed to disconnect power from user equipment at a preset AC line voltage. The appropriate "trip voltage" depends on the type of electrical equipment. For example, power equipment may be designed to operate within an operating range of 120 VAC +/−15%, where as more sensitive computer equipment may require a tighter tolerance of 120 VAC +/−10%. For other types of electrical equipment it may be necessary to provide over-voltage protection but unnecessary to disconnect AC power in a under-voltage condition. Over-voltage protection circuits, particularly analog protection circuits, are not easily modified, and usually require complete redesigns to change trip voltage(s) or to accommodate a new load specification.

For electrical equipment that operates off three-phase power, phase monitoring is desirable in addition to voltage amplitude monitoring. For example, three-phase power equipment is designed to operate from a power supply having each phase offset 120 degrees from the remaining two phases. When any phase of the power supply is deviates from the 120 degrees offset, there is no longer an evenly distributed output of power to the electrical equipment. If the power supply is severely out of phase, for example, if two or more phases have a small or zero phase difference, the power supply can damage the three phase load. The phase and amplitude of a power supply must be monitored to effectively protect three-phase power equipment.

U.S. Pat. No. 4,999,730 discloses a voltage monitor and control circuit that uses analog circuitry to monitor the AC power line voltage signal. The circuit however, does not provide phase monitoring for polyphase power supply signals and also suffers the shortcomings of analog monitoring circuits as described above.

Accordingly, a need remains for a low cost, noise resistent, AC voltage and phase monitor and controller, that is useful or easily adaptable to protect a wide variety of AC-powered equipment.

SUMMARY OF THE INVENTION

One object of the present invention is to protect both single and multiple phase AC-powered user equipment from both over-voltage and under-voltage conditions.

Another object of the invention is to enhance the reliability of an over-voltage and under-voltage protection circuit across a wide range of environmental and electrical conditions.

Another object of the invention is to increase voltage protection for electrical equipment by providing individually adjustable hysteresis at both the AC over-voltage and under-voltage threshold levels.

Yet another object is to increase the accuracy of a voltage monitoring circuit while at the same time reducing the complexity and cost of the circuit by using a digital logic threshold value as a voltage reference for AC over-voltage and under-voltage conditions.

According to the present invention, an automatic voltage protection circuit is provided for controlling a power signal connection between an AC power line and AC-powered user equipment. The circuit includes a relay for switching the power signal connection between the AC power line and the user equipment. It also includes an AC rectifying circuit, coupled to the power line, for providing a DC monitor signal. The DC monitor signal is so designated to indicate that its polarity with respect to ground is constant. However, its magnitude (voltage) varies responsive to the AC power line voltage.

A digital voltage comparator circuit receives the DC monitor signal and generates a fault indication signal whenever the AC line voltage falls outside a predetermined voltage window. A switch control circuit receives the output from the digital voltage comparator circuit and disconnects the AC power line from the load in response to the fault indication signal.

Voltage dividers in the digital voltage comparator circuit scale the DC monitor signal into two digital logic signals. The first digital logic signal rises above a predetermined digital logic "high" threshold voltage when the AC line voltage is above the upper limit of a predetermined voltage window. The second digital logic signal falls below a digital logic "low" voltage when the AC line voltage is below the lower boundary of the voltage window. The digital voltage comparator includes two-channels, each channel receives one of the digital logic signals and the channel outputs are logically ORed together to form a fault indication signal.

If the AC line voltage moves outside the voltage window, hysteresis within each channel requires the AC line voltage to move within a smaller voltage range before the fault indication signal is removed. Delay capacitors at the input of each channel also require the AC line voltage to move back inside the voltage window for a predetermined amount of time before the fault indication signal is removed. A filtering capacitor coupled across a digital inverter within one of the channels eliminates oscillation when the AC line voltage fluctuates around either the upper or lower limits of the voltage window. The delay, hysteresis, and filtering circuitry prevent damage to electrical equipment caused by brief repeated excursions of the power line voltage outside the AC operating voltage window.

A relay power supply circuit is coupled to the AC power line and generates a DC reference voltage for energizing the mechanical relay within the switch control circuit. A comparator power supply circuit is also coupled to the AC power line and generates a DC reference voltage for the digital voltage comparator circuit. By providing separate power supply circuits, noise is isolated within the voltage protection circuit. An alternative DC power supply circuit is described that generates the DC monitor signal and the reference voltage for both the digital voltage comparator circuit and the switch control circuit.

The switch control circuit comprises a transistor that receives the fault indication signal from the digital voltage comparator circuit. The transistor controls a mechanical relay that connects or disconnects the AC power line from the electrical equipment. A filtering capacitor is coupled to the base of the transistor to further eliminate any chance of noise causing intermittent coupling of the AC power line to the load.

The voltage protection circuit described above is integrated into a system for monitoring and controlling three-phase line voltage. A switch control circuit is provided for controlling the connection between a three-phase power supply and a load. One voltage protection circuit, as described above, is coupled to each phase of the polyphase power supply. If any phase of the power supply is outside a predetermined voltage window a fault indication signal is generated. A phase monitor circuit is coupled to the power supply and generates a fault condition if any two phases of the power supply are outside a predetermined phase angle.

The phase monitor circuit includes two bipolar transistors each coupled to a different phase of the power supply. Whenever either phase of the power supply is in its positive half-cycle, the associated transistor generates a pulse that is fed into a flip-flop. No phase error occurs if the positive half-cycle of the second phase occurs within a predetermined amount of time after the positive half-cycle of the first phase. If the positive half-cycle of the second phase does not however, occur within a predetermined amount of time after the first phase, a fault indication signal is generated by the flip-flop.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Functional Overview

Figure 1:
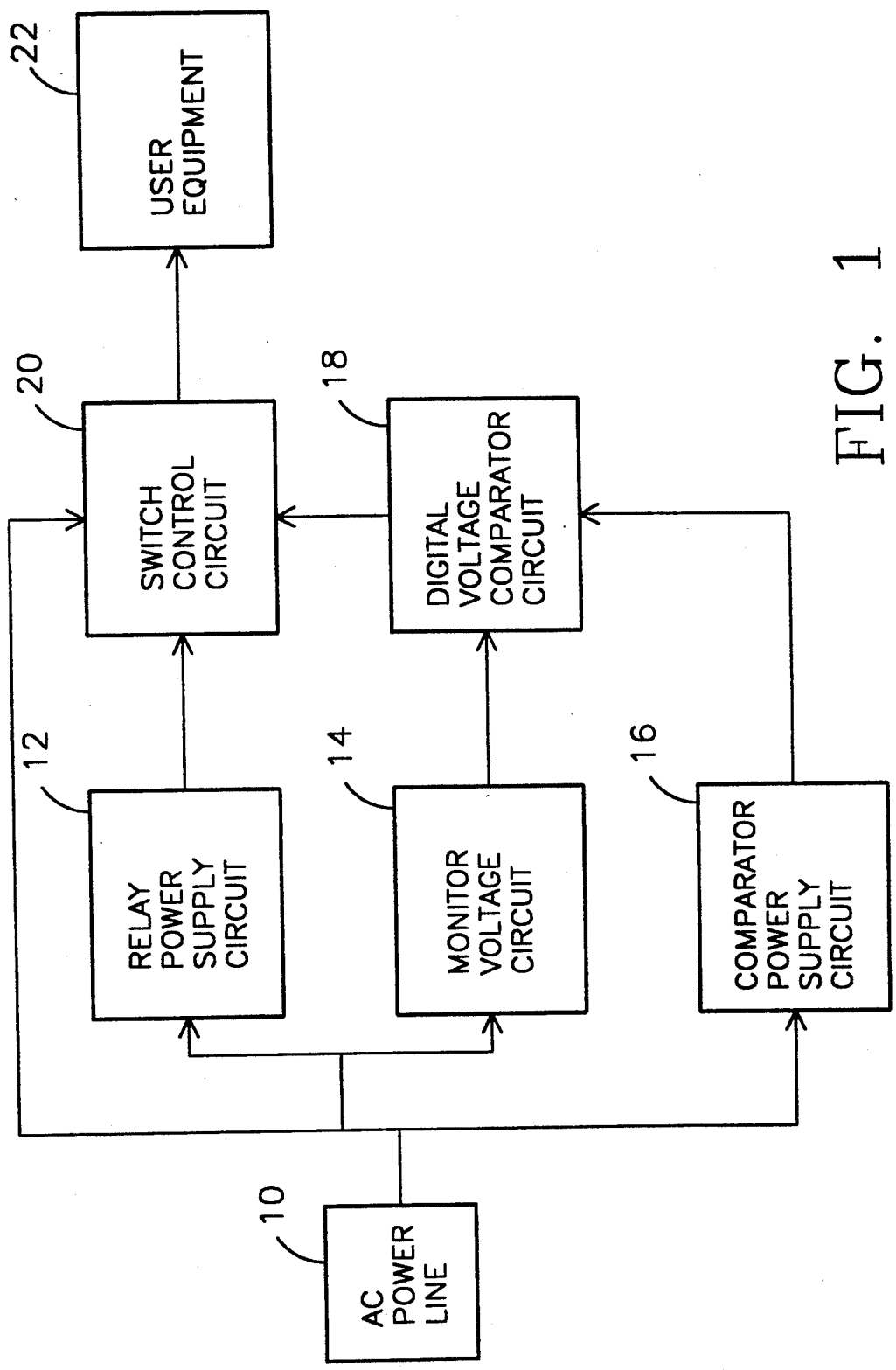
FIG. 1 is a functional block diagram of a voltage protection circuit according to the present invention, the voltage protection circuit disposed between an AC power line and AC-powered user equipment.

FIG. 1 is a functional block diagram of a voltage protection circuit for a single-phase power signal connection between an AC power line 10 and user equipment 22. AC power line 10 provides power which is connected to the user equipment through a switch control circuit 20. The switch control circuit 20 disconnects AC power line 10 from user equipment 22 whenever the AC power line voltage is outside a predetermined AC operating voltage range. Preferably, a predetermined upper voltage limit and a predetermined lower voltage limit together define an acceptable AC operating voltage window. Relay power supply circuit 12 receives the AC power line 10 and generates a DC supply voltage for switch control circuit 20. Comparator power supply circuit 16 generates a DC supply voltage to power digital voltage comparator circuit 18.

A monitor voltage circuit 14 is coupled to AC power line 10 and generates a DC monitor voltage responsive to the AC power line voltage. A digital voltage comparator circuit 18 receives the DC monitor voltage and generates a fault indication signal to switch control circuit 20 when the AC power line voltage is outside the predetermined voltage window. Switch control circuit 20 in response to the fault indication signal, disconnects AC power line 10 from user equipment 22. After the AC power line voltage returns within the operating voltage window for a predetermined amount of time, digital voltage comparator circuit 18 stops generating the fault indication signal allowing switch control circuit 20 to reconnect AC power line 10 to user equipment 22.

Circuit Description

Figure 2:
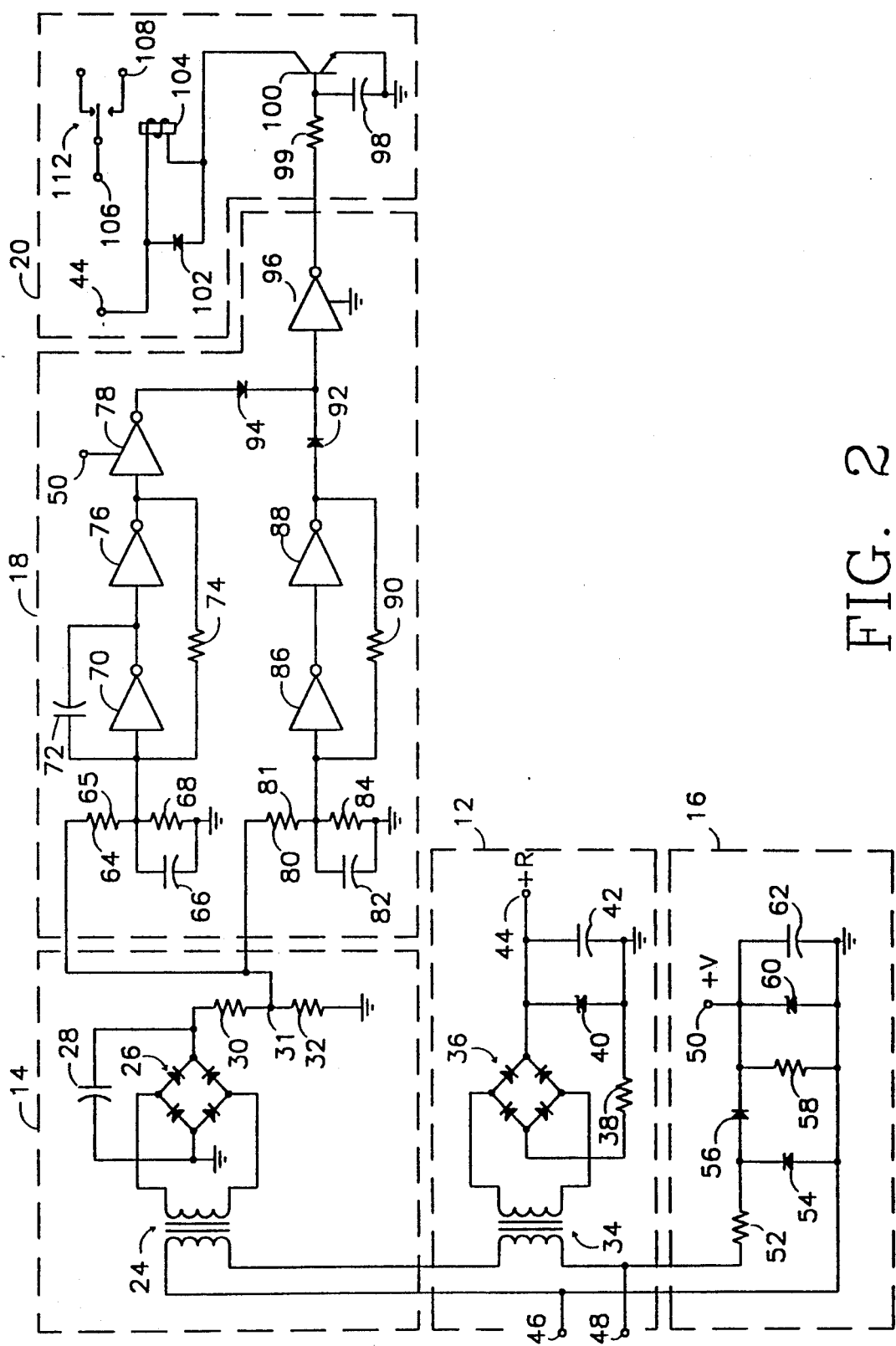
FIG. 2 is a schematic diagram of a circuit for implementing the voltage protection circuit of FIG. 1.

FIG. 2 depicts an electronic circuit for implementing the functions outlined above. Dashed boxes 14, 18, 20, 12, and 16 represent monitor voltage circuit 14, digital voltage comparator circuit 18, switch control circuit 20, relay power supply circuit 12, and comparator power supply circuit 16 of FIG. 1 respectively. AC power line 10 (FIG. 1) feeds the control circuit at input terminals 46 and 48.

Monitor voltage circuit 14 contains a transformer 24 coupled at the primary to the AC power line and coupled at the secondary to the inputs of a floating full-wave bridge rectifier circuit 26. A filter capacitor 28 and a voltage divider, comprising resistors 30 and 32, are coupled to the output of bridge 26. The diodes within bridge 26 in conjunction with non-polarized capacitor 28 provide a flat variable DC voltage at the output of bridge 26. The values of resistors 30 and 32 are selected to further scale the DC voltage into a DC monitor voltage at node 31.

Digital voltage comparator circuit 18 includes a first voltage divider comprising resistors 64 and 68 connected in series between node 31 and ground and generate a first digital logic signal at node 65. A second voltage divider comprises resistors 80 and 84 connected in series between node 31 and ground, generating a second digital logic signal at node 81. Delay capacitor 66 is coupled across resistor 68 and delay capacitor 82 is coupled across resistor 84.

Voltage monitor circuit 18 has a first channel comprising three digital logic inverters 70, 76, and 78 connected in series. The input of inverter 70 is coupled to node 65 and the output of inverter 78 is coupled by diode 94 to the input an inverter 96. A filter capacitor 72 is coupled across inverter 70 and a feedback resistor 74 resistively couples the output of inverter 76 to node 65.

A second channel of voltage comparator circuit 18 comprises inverters 86 and 88 connected in series. The input of inverter 86 is coupled to node 81 and the output of inverter 88 is coupled by diode 92 to the input of inverter 96, Feedback resistor 90 couples the output of inverter 88 to node 81.

Switch control circuit 20 comprises a resistor 99 resistively coupling the output of inverter 96 to the base of bipolar transistor 100 where a filter capacitor 98 filters noise from the base of the transistor. Relay 112 comprises a first switch terminal 108 coupled to user equipment 22 (FIG. 1) and a second switch terminal 106 coupled to AC power line 10 (FIG. 1). A coil 104 connects the DC reference voltage from relay power supply circuit 12 to the collector of transistor 100. EMF suppression diode 102 is coupled across coil 104 to provide junction puncture protection for transistor 100.

Relay power supply circuit 12 comprises a transformer 34 receiving the AC power line 10 (FIG. 1) at the primary and coupled to the input of a full-wave bridge rectifier circuit 36 at the secondary. Filter capacitor 42 and zener diode 40 are both coupled to a first output terminal of bridge 36 and a resistor 38 is coupled to a second output terminal of bridge 36. Capacitor 42 smooths the DC reference voltage at the bridge output and zener diode 40 clamps the voltage level of the DC reference voltage +R. Relay power supply circuit 12 operates off a separate transformer to supply the necessary current to activate mechanical relay 112 and to isolate ringing effects when relay 112 is initially activated.

Comparator power supply circuit 16 comprises a resistor 52 resistively coupling AC power line 10 to the anode of diode 56 and the cathode of diode 54. The anode of diode 54 is coupled to ground. Diode 56 generates a DC voltage at output terminal 50 while filter capacitor 62, coupled to terminal 50, smooths the DC voltage. A zener diode 60 and a resistor 58 are coupled to terminal 50. The zener diode clamps the DC reference voltage +V. The DC voltage +V at terminal 50 is supplied to digital voltage comparator circuit 18.

Application of AC Line Voltage

The voltage on the AC power line is reduced by step-down transformer 24 and then scaled further by resistive divider 30, 32 to form a "monitor voltage" at 31. Resistor 30 may be variable for adjusting the monitor voltage at node 31 to account for any variances in transformer parameters. The monitor voltage is scaled again at node 65 to form a first digital logic signal that changes logic state when the AC power line signal is in an under-voltage condition. The monitor voltage also is scaled at node 81 to form a second digital logic signal that changes logic state when the AC power line voltage is in an over-voltage condition.

Digital Logic Threshold Voltages

The present invention takes advantage of the stable reference voltage provided in every integrated circuit digital logic device. This is contrary to typical analog voltage comparator circuits that must generate a separate reference voltage to compare with the signal that is monitored. For example, an analog voltage comparator circuit that protects against over-voltage conditions must first generate a reference voltage. The reference voltage along with some representation of the AC line voltage are both fed into separate inputs of an analog voltage comparator. If the AC line voltage rises above the reference voltage, the output of the voltage comparator changes state, generating an error condition. This technique for monitoring voltage is problematic in that the reference voltage does not remain stable with changes in temperature or changes in electrical component parameters. Moreover, the additional circuitry needed to generate the reference voltages is also susceptible to noise and increases the cost of the monitor circuit.

To eliminate these problems, the digital logic threshold value of a digital logic gate is used as a reference voltage for indicating a fault when the AC line voltage is outside a predetermined voltage window. For example, Table 1 illustrates worst case TTL and CMOS logic threshold parameters for a VCC of 5 volts. These are industry standards.

TABLE 1

| | Threshold Voltages | | | |
|---|---|---|---|---|
| | CMOS | | TTL | |
| | Min | Max | Min | Max |
| VIH | 3.5 | | 2.0 | |
| VIL | | 1.0 | | 0.8 |
| VOH | 4.9 | | 2.4 | |
| VOL | | 0.1 | | 0.4 |

Where:
VIH = High-Level Input Voltage
VIL = Low-Level Input Voltage
VOH = High-Level Output Voltage
VOL = Low-Level Output Voltage Since the values of VIH (min.) and VIL (max.) are held to close tolerances, these logic threshold values provide a precise reference voltage without the need for additional circuitry. The digital logic threshold values (VIL and VIH) are also more stable over a wider range of temperatures than a reference voltage generated by discrete analog components. In addition, because the logic threshold voltage is inherent within the integrated circuit, the digital voltage comparator circuit is less susceptible to noise. If there are any variations in the digital logic threshold values, resistors 80 and 64 may be adjusted to precisely set the desired AC power line voltage window.

Thus, to generate an over-voltage fault indication signal, the digital logic signal at node 81 is set so that it rises above 1.0 volts (CMOS), when the AC line voltage reaches the upper limit of the predetermined voltage window. This in turn generates a fault indication signal at the output of inverter 96. The upper and lower channels of digital voltage comparator circuit 18 thereby generates an "active low" fault indication signal at the output of inverter 96 when the AC power line voltage is outside a predetermined range.

For example, to disconnect power from user equipment 22 (FIG. 1) when the line voltage is greater than 132 volts or less than 109 volts (e.g. 120 VAC +/−10%), the voltage at node 65 is set to fall below the digital logic threshold of inverter 70 when the AC line voltage falls below 109 volts. The voltage at node 81 is set to rise above the digital logic threshold of inverter 86 when the AC line voltage rises above 132 VAC.

When the AC power line voltage rises above 132 VAC, the output of inverter 86 goes low causing the output of inverter 88 to go high (i.e. fault condition). The low output on inverter 96 shuts off transistor 100 to de-energize coil 104 and disconnect the AC power line 10 from user equipment 22. In the alternative, if the AC power line voltage falls below 109 volts the output of inverter 70 goes high forcing the output of inverter 96 low. Relay 112 as described above, disconnects the AC power line from user equipment 22. Thus, the digital comparator generates a fault indication signal (output of inverter 96) whenever the AC power line voltage is outside a predetermined voltage range.

Adjustable Hystersis Feature

The feedback from resistors 74 and 90 provide hysteresis at the inputs of inverters 70 and 86, respectively. Resistor 74 independently alters the hysteresis at the lower threshold of the voltage window and resistor 90 independently alters the hysteresis at the upper threshold of the voltage window. For example, a fault indication signal is generated when the AC power line voltage falls below 109 VAC. To account for five volts hysteresis at the low end of the voltage window, the voltage at node 65 is set to change the output logic state of inverter 70 at 114 VAC. Resistor 74 is thereby selected at 4 mega ohms to produce a voltage at the input of inverter 70 that requires the AC power line voltage to decrease 5 additional volts to transcend the digital logic threshold at the input of inverter 70.

Thus, the AC line voltage must fall below 109 VAC (digital logic threshold trip voltage −5 volts) to change the output state of inverter 70. After the AC line voltage falls below 109 VAC, the output of inverter 70 goes high causing the output of inverter 78 to go low, thereby removing the feedback voltage from the input of inverter 70. Therefore, the AC line voltage must rise above 114 VAC (e.g. the initially set digital logic threshold trip voltage) to remove the fault state from the output of inverter 70.

The hysteresis on the lower channel of digital voltage comparator circuit 18 is set in a similar manner. For example, the voltage at node 81 is set to alter the logic state of inverter 86 when the AC power line voltage rises above 132 VAC. When the AC line voltage is less than 132 VAC, the output of inverter 86 is high forcing the output of inverter 88 low. Therefore, no feedback voltage is supplied to the input of inverter 86. When the AC line voltage rises above 132 VAC, the output of inverter 86 goes low and the output of inverter 88 goes high providing a feedback voltage at the input of inverter 86. Resistor 90 is selected such that the AC line voltage must drop an additional 5 volts before the AC line voltage transcends the digital logic threshold trip voltage of inverter 86. Thus, the AC line voltage must fall below 127 VAC to remove the fault state from the output of inverter 86.

The hysteresis provided by resistors 74 and 90 eliminate intermittent switching of power to the user equipment when the AC line voltage fluctuates around either the upper or lower limits of the voltage window. The amount of hysteresis on the low or high side of the AC voltage window are easily changeable for custom user applications by altering the values of resistor 74 and 90 respectively.

Oscillation Control

Capacitor 72 keeps mechanical relay 112 from oscillating. For example, when the AC line voltage falls outside the voltage window, oscillation can occur that causes digital voltage comparator circuit 18 to first turn off then turn back on, etc. Capacitor 72 works in conjunction with capacitor 98 (in switch control circuit 20) to keep transistor 100 off for a sufficient amount of time so that any noise created by the deactivation of relay 112 transpires before the AC line voltage is reconnected to the user equipment. The delay period may be set by suitable selection of RC component values.

Capacitors 66 and 82 provide activation delays for both the low and high ends of the voltage window. By delaying the reconnection of the AC power line to the user equipment, the user equipment is not subject to intermittent switching, as mentioned above. Thus, delays at both the low and high limits of the AC voltage window are set individually by changing the values of capacitors 66 and 82 respectively.

Diodes 92 and 94 and inverter 96 allow the digital voltage comparator circuit to generate an "active low" fault indication signal. This insures user equipment protection in the event of damage to the voltage protection circuit. For example, since transistor 100 only turns on when the output of inverter 96 is high, digital voltage comparator circuit 18 must be operating for the AC power line to be coupled to the user equipment. If the voltage comparator circuit is damaged (e.g. shorted to ground) switch control circuit 20 disconnects the AC power line from the user equipment until the voltage protection circuit is repaired.

Customized Voltage Protection

The AC voltage window is easily altered by selecting or adjusting resistors 64, 80, and 30. Any combination of these resistors are changeable to allow high precision AC line deactivation at either the upper limit, lower limit or both limits of the AC voltage window. For example, some user equipment may need over-voltage protection but not under-voltage protection. In this situation, the value of resistor 64 can be selected to reduce the under-voltage threshold value. Activation delay times are also individually adjustable after an under-voltage or over-voltage condition with capacitors 66 and 82 as described above.

Figure 3:
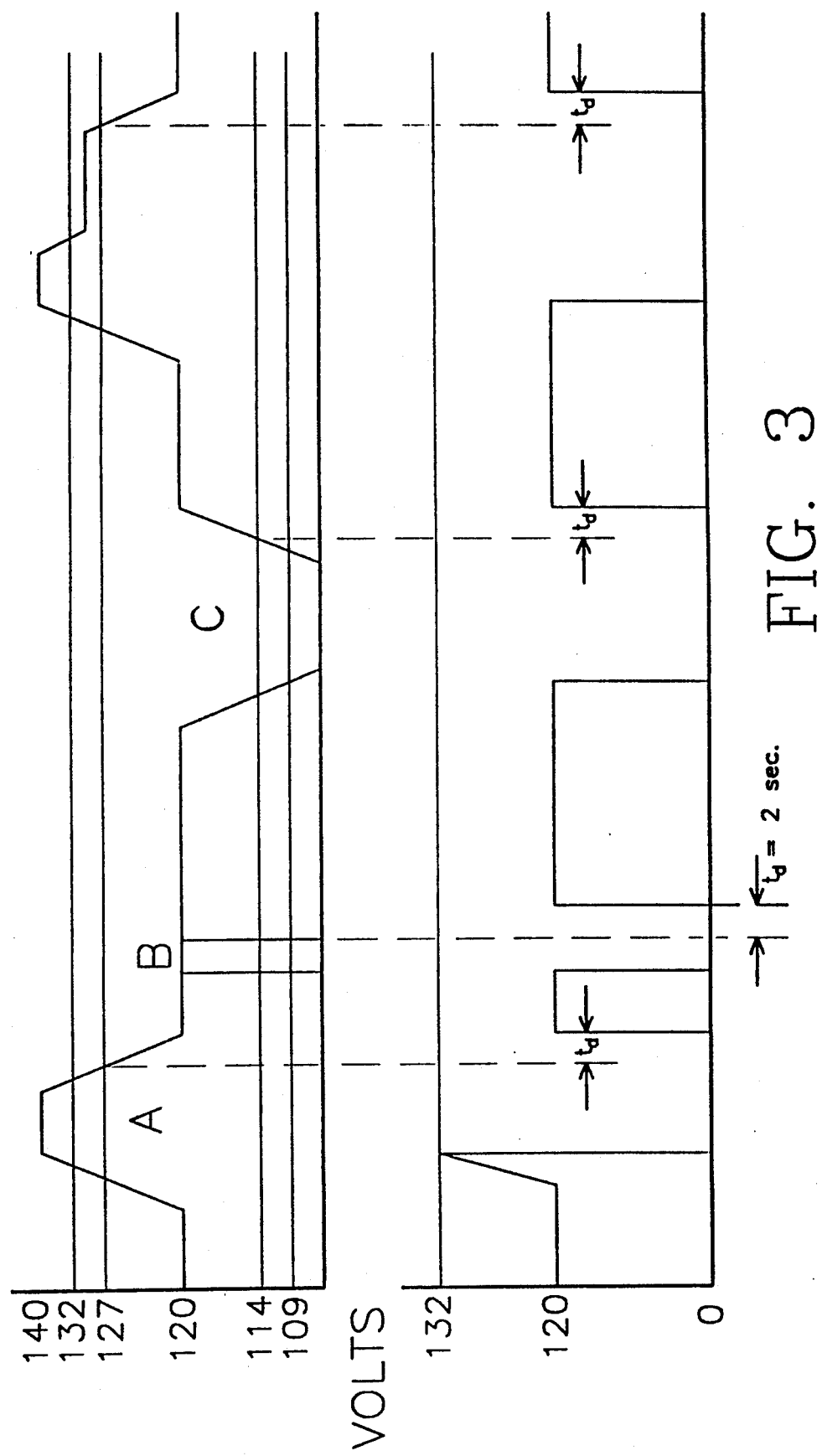
FIG. 3 is a timing diagram illustrating operation of the circuit of FIG. 2 in response to changes in power line voltage.

FIG. 3 illustrates the foregoing operation of the control circuit. The upper portion of FIG. 3 is a graph of a hypothetical AC power line voltage (rms) versus time. The line voltage includes various surges (A), spikes (B) and brown-out conditions (C). The lower portion of FIG. 3 is a graph of the load voltage, i.e., the voltage at the user equipment 22. The horizontal axes of the upper and lower portions of FIG. 3 are registered to illustrate the correspondence between the line voltage and the load voltage.

The AC voltage window is set at 109–132 volts and corresponds to the outer voltage window in the upper graph of FIG. 3. The hysteresis at both the upper and lower limits of the voltage window are each set at 5 volts and appear as the inner voltage window at 114–127 volts, in the upper graph of FIG. 3. Each time the line voltage escapes the outer voltage window, the AC power line is disconnected so that the load voltage drops to zero. The user equipment is reconnected only after the line voltage has remained continuously within the inner voltage window for the delay period, here illustrated as 2 seconds.

Solid Stat Relay Voltage Protection Circuit

Figure 4:
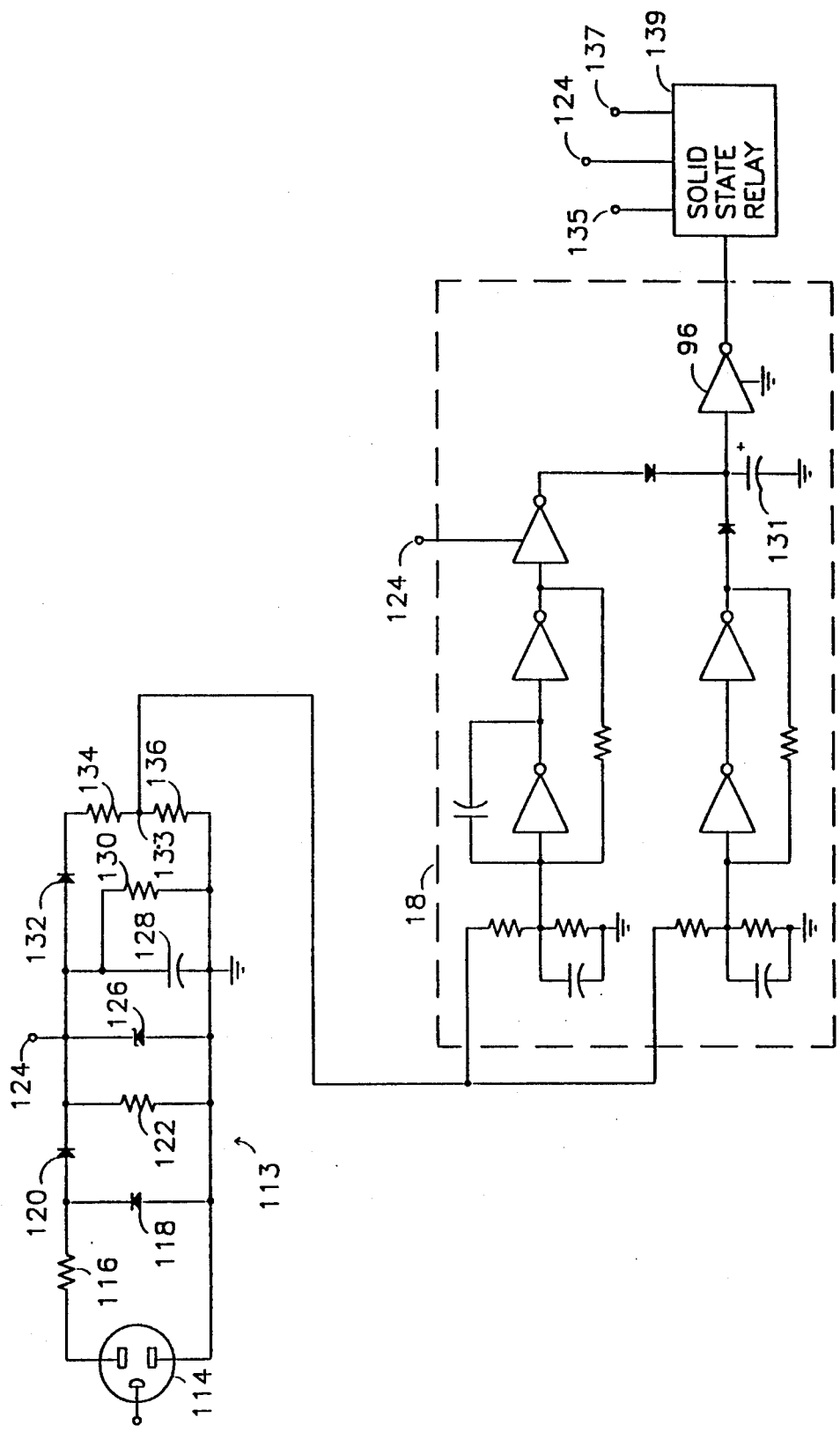
FIG. 4 is a schematic diagram of a transformerless version of the voltage protection circuit illustrated in FIG. 2.

FIG. 4 is a schematic diagram of a transformerless version of the single-phase voltage protection circuit illustrated in FIG. 2. Polarized plug 114 receives the AC voltage from AC power line 10 (FIG. 1). Resistor 116 resistively couples the AC power line voltage to the anode of diode 120. Diode 120 rectifies the AC power line voltage providing a DC reference voltage at output terminal 124. Diode 118 is coupled between the anode of diode 120 and ground and resistor 122 resistively couples the cathode of diode 120 to ground, zener diode 126, filter capacitor 128, and resistor 130 are coupled between ground and output terminal 124. Zener diode 126 clamps the voltage at terminal 124 thereby limiting the peak DC reference voltage. Capacitor 126 smooths the DC reference voltage at terminal 124. A diode 132 couples output terminal 124 to a voltage divider comprising resistors 134 and 136, that provide a monitor voltage at node 133.

Dashed box 18 represents the digital voltage comparator circuit 18 illustrated in FIG. 2 with the addition of a filter capacitor 131 at the input of inverter 96. The digital inverters in digital voltage comparator circuit 18 are powered by the DC reference voltage at terminal 124. The input of digital voltage comparator circuit 18 receives the monitor voltage at node 133 and the comparator output is coupled to a solid state relay 133.

Solid state relay (SSR) 139 receives the DC reference voltage from rectifier circuit 113 at input terminal 124. SSR 139 is coupled to AC power line 10 (FIG. 1) at terminal 135 and the user equipment 22 (FIG. 1) at terminal 137. Solid state relay 139 operates similarly to switch control circuit 20 in FIG. 2. Solid state relay 139 represents any of a number of known solid state switching devices used to switch an AC load, for example, a power transistor, SCR or triac, whose operation is known to one skilled in the art.

Upon the AC line voltage going outside the voltage window set within monitor circuit 18, the fault indication signal at the output of inverter 96 goes low. Solid state relay 133 is deactivated, disconnecting the AC power line from the AC user equipment. After the AC line voltage returns within the voltage window, as described above for FIG. 2, the output of inverter 96 goes high, reconnecting the AC power supply to the AC user equipment.

Since SSR 139 does not require as much power to operate as mechanical relay 112 (FIG. 2), a separate transformer/power supply circuit is not required. Thus, the DC monitor voltage and DC reference voltage can be provided by the same transformerless power supply circuit 113. There is also no need to isolate the power supplies for the switch control circuit and the digital voltage comparator circuit since SSR 139 does not generate noise upon activation, as does a mechanical relay. Due to the small operating current of SSR 139 and digital voltage comparator circuit 18, the control circuit in FIG. 4 uses less energy than similar analog voltage control circuits.

Multi-Phase Protection Circuitry

Figure 5:
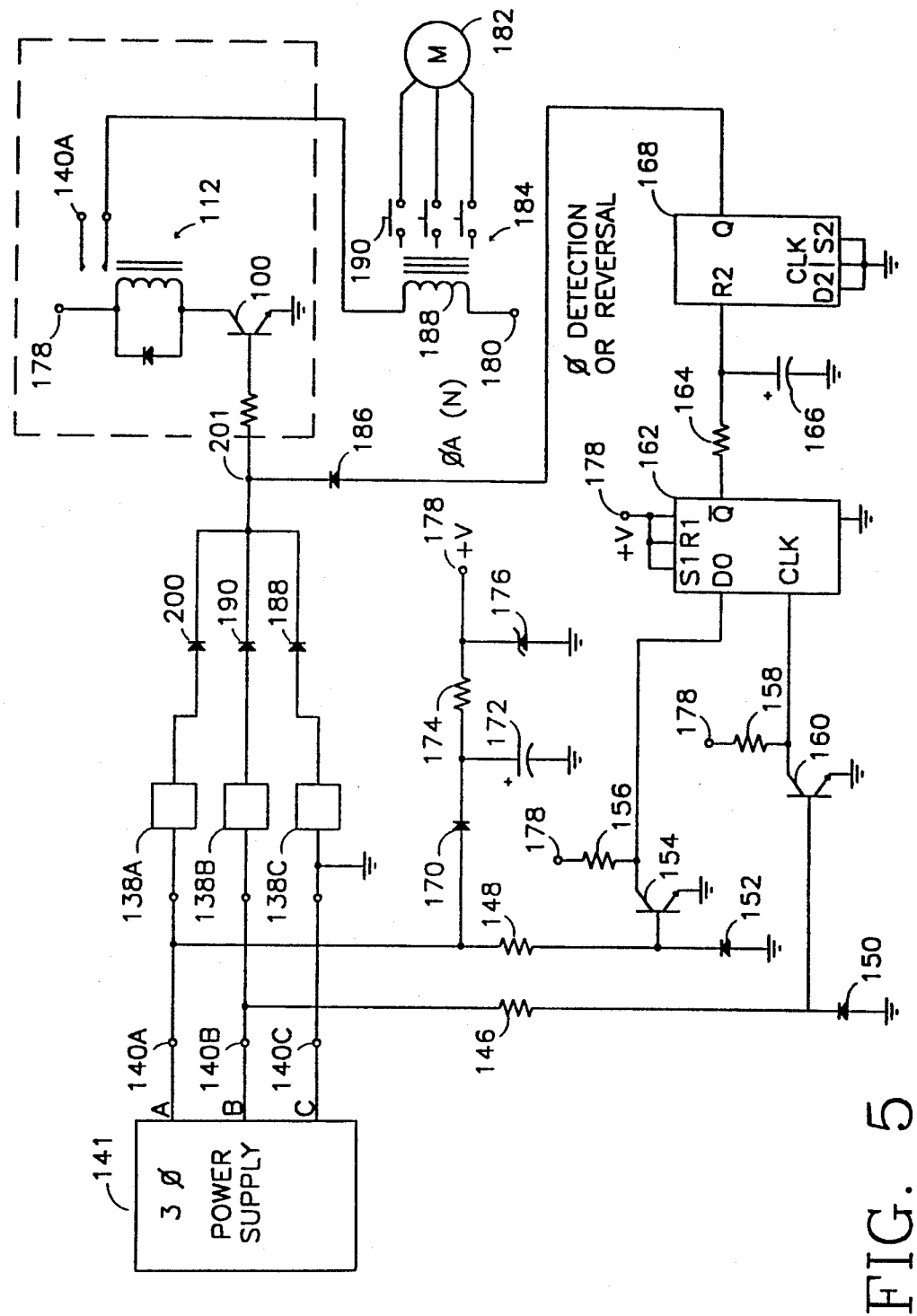
FIG. 5 is a schematic diagram of a three-phase voltage protection circuit using several instance of the voltage protection circuit of FIG. 2.

FIG. 5 is a schematic diagram of a three-phase voltage control circuit according to the present invention. Each phase of a three- phase power supply 141 is received by one of the voltage protection circuits 138A, 138B, and 138C. The output from each protection circuit is fed through a diode into switch control circuit 20 at node 201. Switch control circuit 20 operates similarly to switch control circuit 20 illustrated in FIG. 2.

A single phase of power supply 141 is coupled to the first terminal 140A of relay 112, here shown as phase A. A contactor 184 is coupled between power supply 141 and switch 190 to three-phase motor 182. The second switch terminal of relay 112 is coupled to a coil 188 in contactor 184. The opposite coil terminal is coupled to the neutral of phase A. Phase A of the power supply is converted to a DC voltage by diode 170 and filter cap 172, and clamped by resistor 174 and zener diode 176 to form a DC reference voltage at terminal 178 "+V".

+V provides supply to relay J-K flip-flops 162 and 168, and transistors 154 and 160.

Voltage protection circuits 138A, 138B, and 138C operate in a similar manner as the protection circuit described in FIGS. 2 and 4. Each voltage protection circuit provides over-voltage and under-voltage protection for a separate phase of the power supply. The protection circuits can use either the transformer based circuit of FIG. 2 or the transformerless solid state relay controlled circuit of FIG. 4. When any phase of the power supply is outside the predetermined voltage window, the voltage protection circuit coupled to that phase generates a fault signal at node 201. The fault signal turns on transistor 100 disconnecting phase A from coil 188 of contactor 184. The removal of power from coil 188 cause contactor 184 to disconnect three-phase power supply 141 from motor 182.

When all three-phases of the power supply return within the predetermined voltage windows set in protection circuits 138A, 138B, and 138C, as described above, the fault indication signal at node 201 is removed. This turns off transistor 100 reconnecting phase A of the power supply to coil 188 of contactor 184, thereby reconnecting the power supply to three-phase motor 182. Thus, multiple voltage protection circuits can be used concurrently to provide both over-voltage and under-voltage protection to three-phase electrical equipment.

To protect motor 182 from power supply phase changes, phase loss and phase reversals, the amplitude for two phases of the power supply are monitored.

Operation of Phase Protection Circuitry

Phase monitoring is implemented as follows. The base of transistor 154 is coupled to ground by diode 152 and is fed phase A of the power supply through resistor 148. The base of transistor 160 is coupled to ground by diode 150 and is fed phase B of the power supply through resistor 146. The collectors of transistor's 154 and 160 feed the data and clock inputs of J-K flip-flop 162 respectively and the emitters are coupled to ground. The inverted output of J-K flip-flop 162 is delayed by a RC circuit comprising resistor 164 and capacitor 166 before feeding the reset input of J-K flip-flop 168. The output of J-K flip-flop 168 is coupled by diode 186 to node 201.

In operation, for example, when phase B of the power supply is in the positive half of its cycle, transistor 160 turns on, pulling the voltage at the clock input of J-K flip-flop 162 to ground. When phase B starts into the negative half of its cycle, transistor 160 shuts off and the reference voltage at terminal 178 pulls the voltage at the clock input high. Similarly, transistor 154 generates a low logic signal during the positive half cycle of phase A and a high logic signal during the negative half cycle of phase A.

Therefore, when the phase angle between phase A and phase B are correct (e.g. 120 degrees apart), the rising edge of the clock input signal, generated by transistor 160, occurs when the data input signal, generated by transistor 154 is low. J-K flip-flop 162 latches the low data input at the rising edge of the clock input, generating a logic high signal at the flip-flop inverted output. The high output of J-K flip-flop 162 is fed through resistor 23 to the reset input of J-K flip-flop 168. J-K flip-flop 168 generates a latched low output that is fed through diode 186 to the input of switch control circuit 20.

In a phase error condition, the phase difference between phase A and phase B is greater than a predetermined value. This occurs, for example, when there is a phase reversal in one phase of the power supply. During the phase error condition, the positive half cycle of phase B is completed before the beginning of the following positive half cycle of phase A. Thus, the rising edge of the clock input pulse occurs while the data input pulse is in a high logic state. J-K flip-flop 162 thereby generates a low output signal at Q that generates a fault indication signal at the output of flip-flop 168. The fault indication signal turns transistor 100 on, in turn deactivating contactor 184 and disconnecting power supply 141 from motor 182. The reactivation of power to motor 182 is delayed by capacitor 166 to eliminate switching oscillations.

Figure 6:
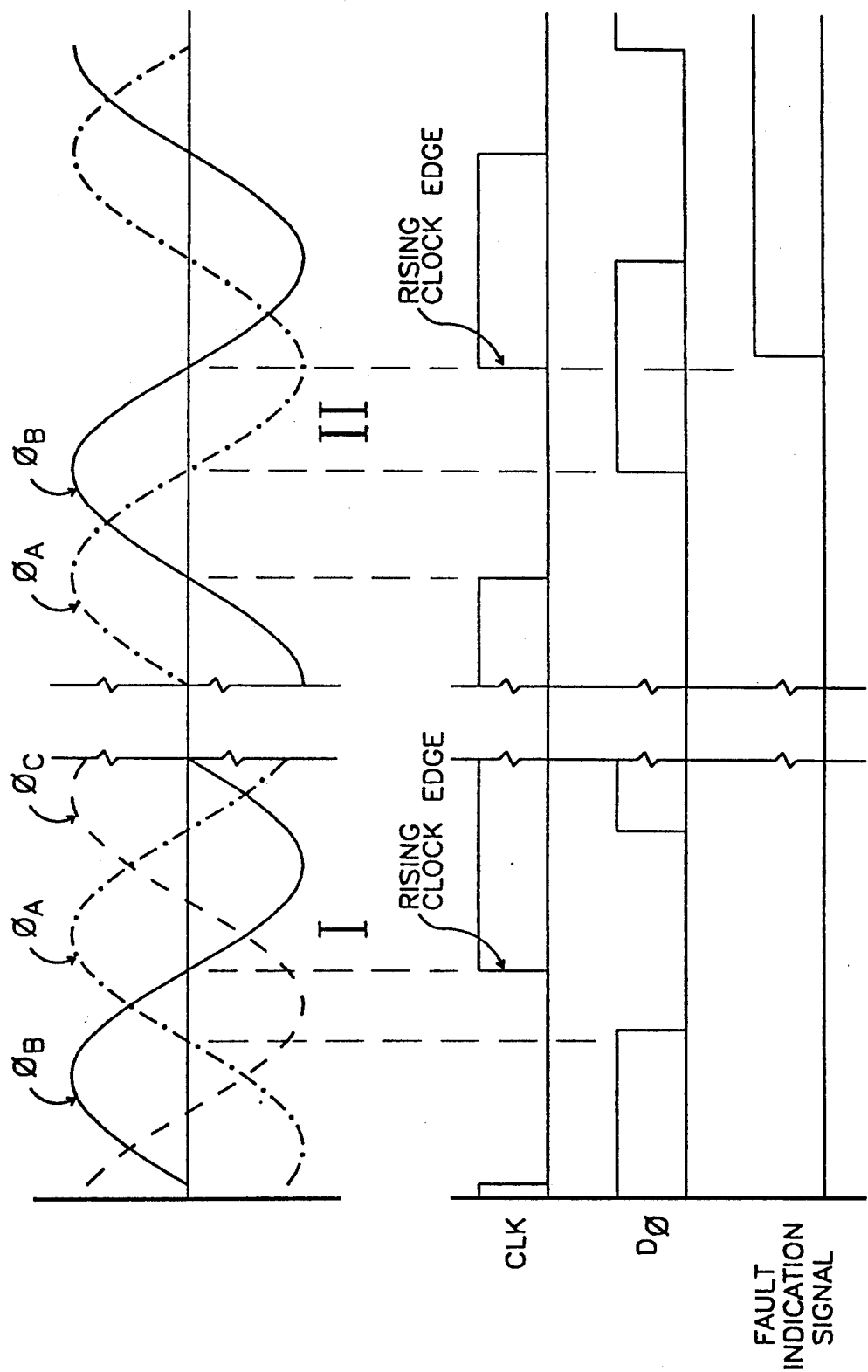
FIG. 6 is a timing diagram illustrating operation of the circuit of FIG. 5 in response to changes in power line phase conditions.

FIG. 6 illustrates the foregoing operation of the three-phase voltage protection circuit. The upper portion of FIG. 6 is a graph of a hypothetical three-phase AC power supply voltage versus time. The line voltage in the first half (I) of the upper graph illustrates each phase of the power supply voltage equally separated by 120 degrees (non-error condition). The second half of the upper graph (II) illustrate phases A and B, with phase A reversed by 180 degrees with respect to phase A in the first half of the upper graph (error condition).

The lower portion of FIG. 6 is a graph of the clock (CLK), data (D∅), and fault indication signals received and generated by flip-flop 162. The horizontal axes of the upper and lower portions of FIG. 6 are registered to illustrate the correspondence between the power supply phase angles and fault conditions. As long as the phase difference between phases A and B is small enough so that the positive half cycle of phase A is initiated before the completion of the positive half cycle of phase B, the fault indication signal remains low. When the phase lag is too large, the positive half cycle of phase A occurs after phase B has already begun its negative half cycle. Thus, the power supply is out of phase and a fault indication signal is generated.

Having illustrated and described the principles of my invention in a preferred embodiment thereof, it should be readily apparent to those skilled in the art that the invention can be modified in arrangement and detail without departing from such principles.

I claim all modifications coming within the spirit and scope of the accompanying claims.

We claim:

1. A digital control circuit for controlling the connection of power from an AC power supply to a AC load, the circuit comprising:

switch means for controlling the connection between the AC power supply signal and the AC load, conversion means for generating a DC voltage responsive to the AC power supply signal voltage, first and second scaling means each coupled to the conversion means for scaling the DC voltage to form first and second independently adjustable digital monitoring signals each monitoring signal responsive to the AC power supply signal and capable of generating a different voltage level, the first digital monitoring signal traversing a first predetermined logic level when the Ac power supply line voltage is in an under-voltage condition and the second digital monitoring signal traversing a second predetermined logic level when the AC power supply line voltage is in an over-voltage condition; and first and second digital comparator means, each comprising a digital logic gate coupled to receive a corresponding one of said digital monitoring signals and including independent feedback means for providing separately adjustable hystersis, each logic gate having an internally generated voltage level that is used as a reference to determine the logic state of the corresponding digital monitoring signal, the first and second comparator means generating a fault condition signal when either of said corresponding digital monitoring signals traverses the internal reference voltage of the corresponding digital logic gate.

2. A digital control circuit according to claim 1 further comprising noise filter means coupled across at least one of the logic gates for preventing the output of the gate from unintentionally oscillating between fault and non-fault conditions.

3. A digital control circuit according to claim 1 further comprising first and second delay capacitors coupled to the input of the first and second digital comparator means respectively for individually delaying the removal of the fault condition from the logic gate whenever the AC line voltage is no longer in one of said under-voltage and over-voltage states.

4. A digital control circuit according to claim 1 wherein the independent feedback means of the first and second digital comparators means allow the first and second digital signals to activate said fault condition at separate controllable voltage levels and deactivate said fault condition at separate controllable voltage levels independent from the fault activation voltage levels.

5. A digital control circuit according to claim 4 in which the feedback means comprise;
second logic gates serially coupled to the first logic gates, and;
first and second resistors, the first resistor coupled across the logic gates of the first channel and the second resistor coupled across the logic gates of the second channel for providing separately controllable hystersis at the inputs of the first and second digital comparator means respectively.

6. A digital control circuit according to claim 5 wherein at least one of the first and second digital comparator means further comprises a third digital logic gate serially coupled to the output of the second logic gate for inverting the fault indication signal.

7. A digital control circuit according to claim 1 including means for combining the output of the first digital comparator means with the output of the second digital comparator means so that an over-voltage and an under-voltage condition generate a single fault indicator signal.

8. A circuit for monitoring a three-phase power supply signal and controlling the connection between the power supply signal and a load, the circuit comprising;
switch means for controlling the connection between the three phase power supply signal and the load (20),
digital voltage level monitoring means coupled to the three-phase power supply signal for disconnecting the power supply from the AC load when any phase of the power supply signal is outside a predetermined voltage window (138A, 138B, 138C), the digital voltage level monitoring means including conversion means for generating a DC voltage responsive to the AC power supply signal voltage.

first and second scaling means each coupled to the covnersion means for scaling the DC voltage to form first and second separately controllable digit monitoring signals each responsive to the AC power supply signal, the first digital monitoring signal traversing a first predetermined logic level when the AC power supply line voltage is in an under-voltage condition and the second digital monitoring signal traversing a second predetermined logic level when the AC power supply line voltage in in an over-voltage condition, and first and second digital comparator means, each comprising a digital logic gate coupled to receive a corresponding one of said digital monitoring signals and including means for providing separately adjustable hystersis, each logic gate having an internally generated voltage level that is used as a reference to determine the logic state of the corresponding digital monitoring signal, the first and second comparator means generating a fault condition signal when either of said corresponding digital monitoring signals traverses the internal reference voltage of the corresponding digital logic gate; and digital phase monitoring means coupled to the power supply signal for disconnecting the power supply from the AC load when any two phases of the power supply are within a predetermined phase angle, the phase monitoring means having an internally generated voltage level that is used as a reference to determine a digital logic state for each of said two phases, the logic state of the two phases compared to determine when said phases are within the predetermined phase angle (154, 160, 162, 169).

9. A circuit according to claim 8 in which the voltage level monitoring means including three voltage monitor circuits, each monitor circuit comprising an input and an output wherein each input is responsive to a separate phase of the power supply and the outputs are combined to provide a single fault indication signal (138A, 138B, 138C, 200 190, 188).

10. A circuit according claim 8 in which the voltage level monitor means include a separate voltage comparator circuit for each phase of the AC power supply signal each monitor circuit comprising:
conversion means for generating a DC monitor voltage responsive to one phase of the AC power supply voltage, (14)
first and second channels, each channel having an input and an output, the inputs coupled to the conversion means for receiving the DC monitor voltage.

11. A circuit according to claim 10 in which the first channel includes a voltage scaling means coupled to the conversion means for scaling the DC monitor voltage to form a digital signal that traverses a predetermined logic level when the AC power supply line voltage is in an over-voltage condition.

12. A circuit according to claim 10 in which the second channel includes a voltage scaling means coupled to the conversion means for scaling the DC monitor voltage to form a digital signal that traverses a predetermined logic level when the AC power supply line voltage is in an under-voltage condition.

13. A circuit according to claim 8 wherein:
the digital phase monitoring means include first and second digital pulse generation means for providing first and second digital logic pulses, the first pulse generation means responsive to each cycle of a first phase of the power supply signal and the second pulse generation means responsive to each cycle of a second phase of the power supply signal so that the phase relationship of the digital logic pulses reflects the ∅ angle between the first and second phase of the power supply signal respectively.

14. A circuit according to claim 13 including a first flip-flop having a clock input, a data input, and an output, the clock input coupled to receive the first digital logic pulse, and the data input coupled to receive the second digital logic pulse, so that the output provides a phase error signal whenever the time between the occurrence of the first pulse and the second pulse is outside a predetermined time range.

15. A circuit according to claim 14 further comprising a second flip-flop coupled to the output of the first flip-flop for latching the phase error signal.

16. A circuit according to claim 8 wherein:
the digital phase monitoring means includes a digital memory means having a data input terminal for receiving a data input signal and a clock input terminal for receiving a clock signal, the memory means being arranged for storing the data input signal and presenting it at an output terminal in repsonse to assertain of the clock signal; and
a first phase of the power supply is coupled to the data input of the digital memory means to provide the data input signal, and a second phase of the power supply is coupled to the clock input of the digital memory means to provide the clock signal, so that a predetermined logic state is presented at the output terminal so long as the first and second phases of the power supply exhibit a predetermined phase relationship, whereby an internally-generated reference voltage in the digital memory means provides a reference voltage for converting the first and second power supply phases into digital the said digital signals; and
the digital memory means output terminal is coupled to the switch means (20) for controlling the connection between the three-phase power supply signal and the load.

17. A circuit according to claim 16 wherein the digital memory means includes a J-K flip-flop circuit.

18. A method for controlling a power signal connection between an AC power line and AC-powered user equipment, the method comprising the steps of:
converting the AC power line voltage into a DC monitor voltage;
scaling the DC monitor voltage to form first and second independently controllable digital logic signals each responsive to the AC power supply signal and capable of generating a different voltage amplitude;
monitoring the first and second digital logic signals with a digital logic circuit, the first digital signal traversing a first predetermined logic level when the AC power supply line voltage is in an under-voltage condition and the second digital signal traversing a second predetermined logic level when the AC power supply line voltage is in an over-voltage condition (138, 154, 160, 162);
generating a fault condition signal when one of the first and second digital logic signals indicate either an under-voltage or over-voltage condition, respectively; and
independently controlling hystersis in the digital logic circuit for both the first and second digital logic signals so that each digital logic signal has a first independently controllable fault activation voltage level for activating a fault condition in the digital logic circuit and a second separately controllable fault deactivation voltage level for deactivating the fault condition.

19. A method according to claim 18 wherein hystersis is controlled by feeding back individual under-voltage and over-voltage fault monitoring signals to the first and second digital signals, respectively.

20. A method according to claim 18 including indicating a fault condition whenever two phases of the AC power line voltage are separated by more than a predetermined phase angle.

* * * * *